(12) United States Patent
Hamasaki et al.

(10) Patent No.: US 12,311,883 B2
(45) Date of Patent: May 27, 2025

(54) VEHICLE CONTROL SYSTEM

(71) Applicant: TOYOTA JIDOSHA KABUSHIKI KAISHA, Toyota (JP)

(72) Inventors: Yutaka Hamasaki, Toyota (JP); Akihiko Tanio, Toyota (JP); Hiroshi Shikata, Nisshin (JP); Akira Matsumoto, Toyota (JP); Yuki Hayakawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/432,190

(22) Filed: Feb. 5, 2024

(65) Prior Publication Data

US 2024/0294142 A1    Sep. 5, 2024

(30) Foreign Application Priority Data

Mar. 2, 2023  (JP) ................. 2023-032101

(51) Int. Cl.
  *B60R 25/30*    (2013.01)
  *G01C 22/00*   (2006.01)
  *G06F 21/30*   (2013.01)

(52) U.S. Cl.
  CPC ............ *B60R 25/307* (2013.01); *G01C 22/00* (2013.01); *G06F 21/30* (2013.01)

(58) Field of Classification Search
  CPC ........ B60R 25/307; G01C 22/00; G06F 21/30
  See application file for complete search history.

(56) References Cited

FOREIGN PATENT DOCUMENTS

| JP | 2004137897 A | * | 5/2004 |
|----|---|---|---|
| JP | 2012-247222 A | | 12/2012 |
| JP | 2018160888 A | * | 10/2018 |
| KR | 20170029259 A | * | 3/2017 |
| KR | 102170247 B1 | * | 10/2020 |

* cited by examiner

Primary Examiner — Laura A Gudorf
(74) Attorney, Agent, or Firm — SoraIP, Inc.

(57) ABSTRACT

The vehicle control system of the present disclosure includes a meter-side control device that is installed in a vehicle and can measure the total distance traveled by the vehicle, and a backup device that can obtain a copy of the total distance measured by the meter-side control device. Data communication between the meter-side control device and the backup device uses an authentication signal using a common key, and a new communication between the meter-side control device and the backup device When registering a common key, the larger value of the total mileage value stored in the meter side control device and the total mileage value stored in the backup device is sent to the meter side control device. Total mileage.

12 Claims, 4 Drawing Sheets

VEHICLE CONTROL SYSTEM

CROSS-REFERENCE TO RELATED APPLICATION

This application claims priority to Japanese Patent Application No. 2023-032101 filed on Mar. 2, 2023, incorporated herein by reference in its entirety.

BACKGROUND

1. Technical Field

The present disclosure relates to a vehicle control system.

2. Description of Related Art

A total travel distance totalizer (generally referred to as an "odometer") that displays the total travel distance of a vehicle is known. In Japanese Unexamined Patent Application Publication No. 2012-247222 (JP 2012-247222 A) described below, the lifetime of instruments included in a vehicle is estimated based on a travel distance of a vehicle that is accumulated by a meter electronic control unit (ECU) including an odometer.

SUMMARY

The above-described JP 2012-247222 A describes that, when the value of the total travel distance stored in the meter ECU differs from the value of the total travel distance stored in the ECU of each instrument, the value of the total travel distance is specified by majority vote. However, there is room for further improvement in the method of specifying the total travel distance data of the meter ECU.

An object of the present disclosure is to provide a vehicle control system that can suppress a total travel distance accumulated by an odometer from being falsified and that can execute inheritance of the total travel distance when the odometer is replaced, in a short time.

In order to achieve the above object, a vehicle control system according to claim 1 of the present disclosure includes:
- a meter-side control device that is installed in a vehicle and that is able to measure a total travel distance of the vehicle; and
- a backup device that is able to acquire a copy of the total travel distance measured by the meter-side control device.

In data communication between the meter-side control device and the backup device, an authentication signal using a common key is used.

When a new common key is registered between the meter-side control device and the backup device, a larger value of a value of the total travel distance stored in the meter-side control device and a value of the total travel distance stored in the backup device is taken as the total travel distance of the meter-side control device.

In the vehicle control system according to claim 1, the larger value of the total travel distance values that can be inherited, is inherited at the timing of registration of the common key, such as when the meter-side control device is replaced. Therefore, falsification of the total travel distance can be suppressed. In addition, inheritance of the travel distance can be realized by updating data. As a result, the time required for replacing the meter-side control device, etc. can be shortened.

In the vehicle control system according to claim 2 of the present disclosure, in the vehicle control system according to claim 1, registration of the common key is limited to one time.

In the vehicle control system according to claim 2, by limiting the timing of inheritance of the total travel distance, falsification of the travel distance can be more reliably suppressed.

In the vehicle control system according to claim 3 of the present disclosure, the vehicle control system according to claim 1 further includes:
- in the meter-side control device, a total travel distance measurement unit that measures and holds the total travel distance;
- in the backup device, a backup unit that holds the copy of the total travel distance; and
- a total travel distance inheritance unit that specifies, when the new common key is registered, a larger value of a value of the total travel distance in the total travel distance measurement unit and a value of the copy of the total travel distance in the backup unit, to be the total travel distance of the total travel distance measurement unit.

In the vehicle control system according to claim 3, falsification of the total travel distance can be suppressed, and the total travel distance can be inherited in a short time.

In the vehicle control system according to claim 4 of the present disclosure, the vehicle control system according to claim 3 further includes an authentication error flag that is set to on when an authentication signal generated by the meter-side control device is detected not to be generated using a preset common key, and is set to off when specifying the total travel distance by the total travel distance inheritance unit is executed.

The total travel distance inheritance unit specifies the total travel distance, when the authentication error flag is on.

In the vehicle control system according to claim 4, the travel distance inheritance process can be executed reliably.

In the vehicle control system according to claim 5 of the present disclosure, the vehicle control system according to claim 4 further includes an information-at-inheritance storage unit that is able to store at least one of a value of the authentication error flag when the total travel distance is specified by the total travel distance inheritance unit, the value of the total travel distance in the total travel distance measurement unit, the value of the copy of the total travel distance in the backup unit, and a time when the total travel distance is specified.

In the vehicle control system according to claim 5, it is possible to easily verify the operation of the ECU and execute a performance test.

According to the present disclosure, it is possible to provide a vehicle control system that can suppress a total travel distance accumulated by an odometer from being falsified and that can execute inheritance of the total travel distance when the odometer is replaced, in a short time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments for carrying out the present disclosure will be described below with reference to the drawings. Note that, below, the range necessary for explanation to achieve the purpose of the present disclosure will be schematically shown. Further, below, the scope necessary for explaining the relevant portion of the present disclosure will be mainly explained. Further, in the following description, parts whose explanations are omitted are based on known techniques.

Figure 1:
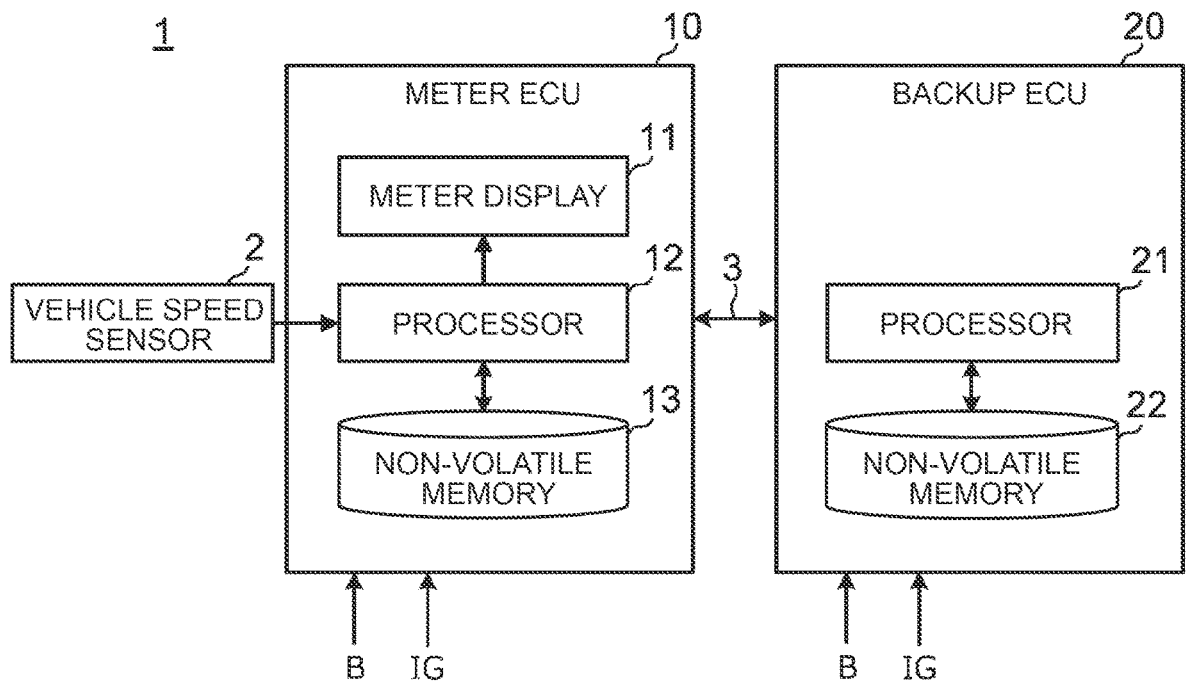
FIG. 1 is a block diagram showing an example of the hardware configuration of a vehicle control system according to an embodiment of the present disclosure.

FIG. 1 is a block diagram illustrating an example of the hardware configuration of a vehicle control system according to an embodiment of the present disclosure. The vehicle control system 1 according to the present embodiment may mainly include a meter-side electronic control unit 10 and a backup electronic control unit 20, as shown in FIG. 1. Note that at least a portion of the meter-side electronic control unit 10 is an example of a meter-side control device that functions as an odometer. Hereinafter, the meter-side electronic control unit 10 will be referred to as "meter ECU 10." Further, the backup electronic control unit 20 is an example of a backup device that can communicate with the meter ECU 10. Hereinafter, the backup device 20 will be referred to as "backup ECU 20."

The meter ECU 10 may be an electronic control device that is installed in the vehicle and controls instruments in the vehicle including an odometer that can measure the total distance traveled by the vehicle. The instruments include, for example, a speedometer and a tachometer. The meter ECU 10 can be configured with, for example, a microcomputer. This meter ECU 10 may include at least a meter-side processor 11, a meter-side nonvolatile memory 12, and a meter display section 13. In addition to the above-mentioned components, the meter ECU 10 may include other components constituting a microcomputer, such as a ROM, RAM, various interfaces, etc., but their explanation will be omitted here.

The meter-side processor 11 may execute various processes for controlling various meters. This meter-side processor 11 can be configured with a Micro Processor Unit (MPU) or a Central Processing Unit (CPU). Among the various processes executed by the meter-side processor 11, the process for realizing the function as an odometer may include, for example, an integration process of odometer data (data on the total distance traveled). The odometer data integration process is based on the signal from the vehicle speed sensor 2. In addition, the processing for realizing the function as an odometer may include processing to prevent subtraction of odometer data, processing to compare traveling distance and traveling speed, high-speed calculation limiter, and the like. Further, in this meter-side processor 11, registration and management of a MAC key, which will be described later, may be performed.

The meter-side nonvolatile memory 12 may be for storing data related to various processes executed by the meter-side processor 11. This meter-side nonvolatile memory 12 can be configured with an electrically erasable programmable read-only memory (EEPROM), a flash memory, or the like. The meter side nonvolatile memory 12 can store the odometer data accumulated by the meter side processor 11. Additionally, a MAC key, which will be described later, can also be stored.

The meter display section 13 is disposed at a suitable location on the instrument panel, for example, and displays the latest total mileage value (hereinafter also referred to as ODO value) based on the odo data stored in the meter side nonvolatile memory 12. It can be anything.

The backup ECU 20 may be constituted by a part of any ECU other than the meter ECU 10 out of the ECUs installed in the vehicle, or an ECU newly installed in the vehicle. In this embodiment, this backup ECU 20 backs up the odd data. Therefore, this backup ECU 20 may include at least a backup-side processor 21 and a backup-side nonvolatile memory 22 in order to realize the backup function.

The backup-side processor 21 can be configured with an MPU or a CPU like the meter side processor 11. This backup-side processor 21 can execute a process of acquiring at least odometer data from the meter ECU 10 and storing the acquired odometer data in the backup-side nonvolatile memory 22. In addition, like the meter-side processor 11, the backup-side processor 21 can execute odometer data subtraction prevention processing and mileage comparison processing. The backup-side processor 21 can also register and manage MAC keys, which will be described later.

The backup-side nonvolatile memory 22 can be configured from an EEPROM, flash memory, etc., like the meter side nonvolatile memory 12. In the backup-nonvolatile memory 22, the odo data acquired by the backup-side processor 21 can be stored as a copy of the odo data. Further, a MAC key, which will be described later, can also be stored in this backup-nonvolatile memory 22.

The meter ECU 10 and the backup ECU 20 may be connected to each other via a Controller Area Network (CAN) 3, for example, so that they can send and receive information to each other. Between the meter ECU 10 and the backup ECU 20, odometer data may mainly be transmitted and received. Moreover, the meter ECU 10 and the backup ECU 20 described above may be connected to a power source via the B terminal and the IG terminal, respectively.

Data communication transmitted and received between the meter ECU 10 and the backup ECU 20 via the CAN 3 is preferably provided with an authentication signal using a common key. Specifically, it is preferable that a Message Authentication Code (MAC), which is an example of an authentication signal created using a common Message Authentication Code (MAC) key, is assigned to data communication. As described above, odometer data is mainly transmitted and received between the meter ECU 10 and the backup ECU 20. By assigning a MAC to the odd data, it is possible to prevent the odd data from being tampered with.

In addition, the number of times a new MAC key is registered between the meter ECU 10 and the backup ECU 20 can be limited to one time. By limiting the number of times a new MAC key is registered, tampering with odd data can be more reliably suppressed.

Figure 2:
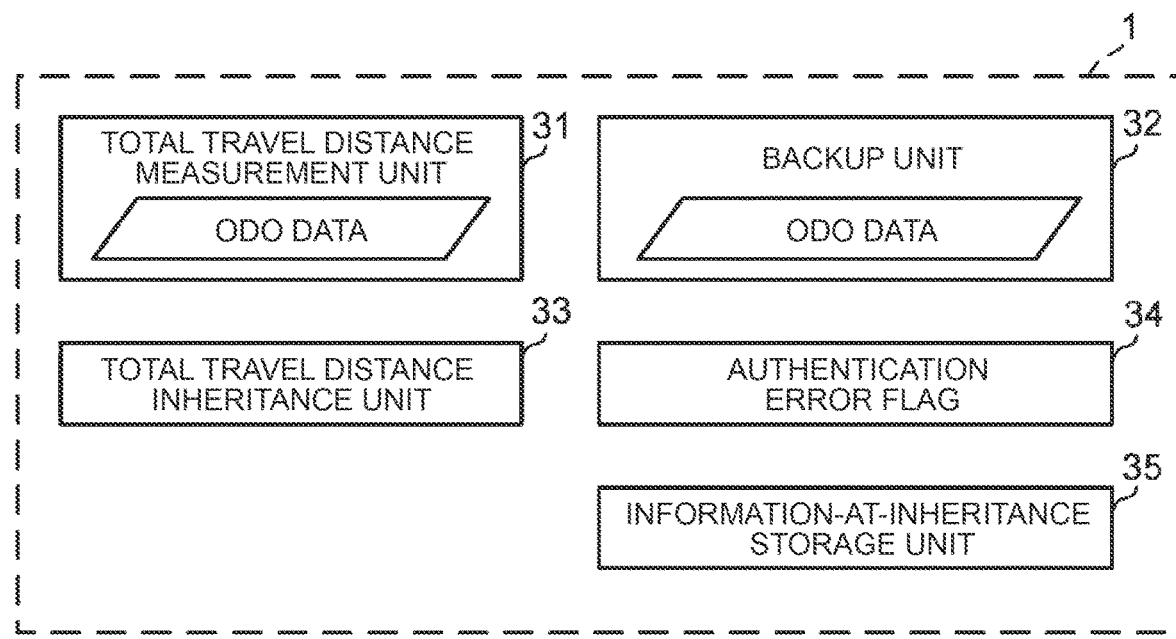
FIG. 2 is a functional block diagram showing an example of the software configuration of the vehicle control system of FIG. 1.

FIG. 2 is a functional block diagram showing an example of the software configuration of the vehicle control system shown in FIG. 1. As shown in FIG. 2, the vehicle control system 1 according to the present embodiment can include at least a total travel distance measurement unit 31, a backup unit 32, and a total travel distance inheritance unit 33.

The total travel distance measurement unit 31 functions as an odometer, and may be realized by the meter ECU 10. The total travel distance measurement unit 31 can measure the total traveling distance of the vehicle based on the output of the vehicle speed sensor 2, and can hold the measured total traveling distance of the vehicle as odometer data.

The backup unit 32 may be capable of retaining a copy of the odo data by periodically acquiring the odo data measured and held by the total travel distance measurement unit 31. This backup unit 32 can be realized by the backup ECU 20. A copy of the odometer data stored in the backup unit 32 may be used in the total travel distance inheritance unit 33.

The total travel distance inheritance unit 33 may inherit the total mileage at the timing when a new MAC key is registered between the meter ECU 10 and the backup ECU 20. More specifically, for example, when the meter ECU 10 is replaced and it becomes necessary to register a MAC key between the replaced meter ECU and the backup ECU 20, a predetermined total number to be inherited by the replaced meter ECU is set. It may be for specifying the distance traveled. This total travel distance inheritance unit 33 can be realized by either or both of the meter ECU 10 and the backup ECU 20. In addition, below, in order to distinguish the total travel distance measurement unit in the meter ECU before and after replacement, the total travel distance measurement unit after replacement may be referred to as "replaced total travel distance measurement unit 31N."

The identification of the total mileage by the total travel distance inheritance unit 33 is preferably carried out at the timing when the total travel distance measurement unit (i.e., meter ECU) is replaced. Specifically, the trigger may be the implementation of a MAC key registration process that is executed when the meter ECU 10 constituting the total travel distance measurement unit 31 is newly installed. By using the execution of the MAC key registration process as a specific trigger for determining the total mileage, it is possible to reliably inherit the total mileage when the total travel distance measurement unit 31 is replaced.

The total travel distance inheritance unit 33 transfers the total mileage value of the replaced total travel distance measurement unit 31N to the total mileage value held by the replaced total travel distance measurement unit 31N and the backup unit 32. This is the larger value of the total distance traveled. Here, the value of the total mileage held by the replaced total travel distance measurement unit 31N is the value of the total mileage stored in the replaced total travel distance measurement unit 31N at the time of replacement. It refers to the value. Therefore, if the replaced total travel distance measurement unit 31N is an unused one, the stored total mileage value is generally 0 km.

By employing the above-described inheritance process by the total travel distance inheritance unit 33, the value of the total mileage inherited by the replaced total travel distance measurement unit 31N does not become shorter than the actual total mileage of the vehicle. Therefore, even if the meter ECU is replaced with a meter ECU with a smaller total mileage value, for example, the total mileage value of the replaced meter ECU will not become shorter than the actual total mileage. Thereby, falsification of the total mileage can be suppressed.

As described above, the total travel distance inheritance unit 33 of this embodiment uses execution of the MAC key registration process as a trigger for specifying the total mileage. However, for example, in order to skip the execution of the inheritance process by the total travel distance inheritance unit 33, an operation such as stopping the power supply to the vehicle control system 1 immediately after the completion of the MAC key registration process is performed based on the value of the total mileage. It can be assumed that someone who wants to falsify the Therefore, in the vehicle control system 1 of the present embodiment, the authentication error flag 34 is set so that the inheritance process by the total travel distance inheritance unit 33 can be executed reliably even when the above-mentioned operation is performed. It can further include:

The authentication error flag 34 is turned on (flag value=1) when it is detected that the MAC as an authentication signal generated by the meter ECU 10 is not generated using a preset MAC key. It may be turned off (flag value=0) when the total travel distance inheritance unit 33 specifies the mileage. This authentication error flag 34 may be stored, for example, in at least one of the meter-side nonvolatile memory 12 and the backup-side nonvolatile memory 22. In connection with this, the total travel distance inheritance unit 33 specifies the total mileage when the authentication error flag 34 is on, regardless of whether registration of the new common key itself is completed or not. do. As a result, even if the power supply to the vehicle control system 1 is stopped immediately after the registration of the MAC key is completed, the total travel distance inheritance unit 33 can set the authentication error flag 34 after restarting the power supply. The inheritance process can be performed based on Therefore, by using the authentication error flag 34, the inheritance process can be carried out reliably when the total travel distance measurement unit 31 is replaced.

In addition, in order to determine whether or not inheritance of odd data is accurately executed, the vehicle control system 1 of the present disclosure may further include an information-at-inheritance storage unit 35. This information-at-inheritance storage unit 35 can be realized by, for example, at least one of the meter side nonvolatile memory 12 and the backup-side nonvolatile memory 22.

The information-at-inheritance storage unit 35 stores the value of the authentication error flag 34 (that is, either 0 or 1) when the total mileage was specified by the total travel distance inheritance unit 33, and the total mileage after replacement. At least one of the total mileage value in the replaced total travel distance measurement unit 31N, the total mileage value in the backup unit 32, and the time at which the total mileage was determined can be stored. The information-at-inheritance storage unit 35 can also store information other than the above-mentioned information as long as it is necessary for verifying the operation of each ECU, performing a performance test, etc.

By storing the above-mentioned information in the information-at-inheritance storage unit 35, it is easy to verify, for example, when inheritance of odd data is not executed correctly, and to check whether the inheritance process is operating normally. You will be able to do this.

Figure 3:
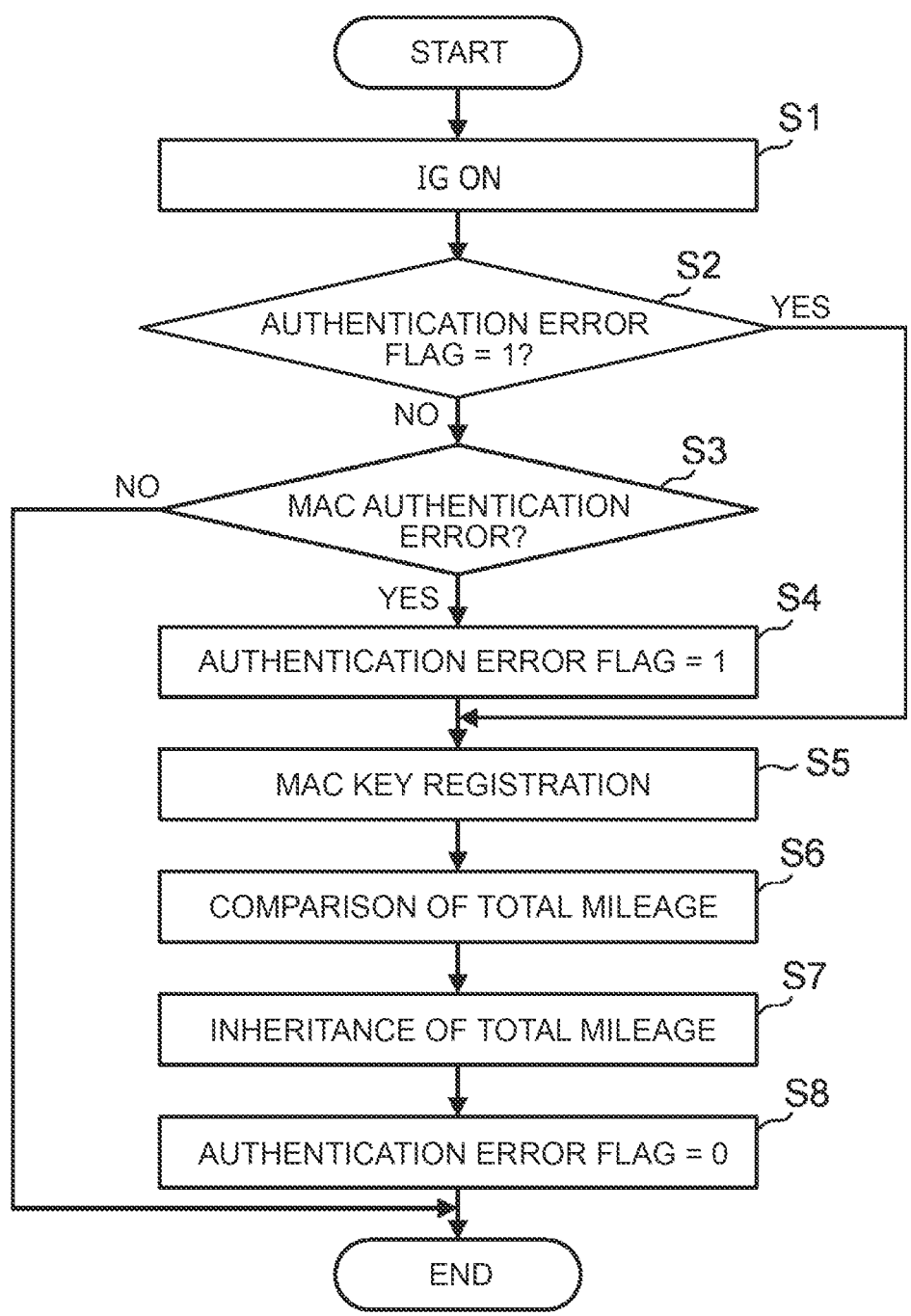
FIG. 3 is a flowchart showing an example of a total mileage inheritance process by the vehicle control system of FIG. 1.
Figure 4:
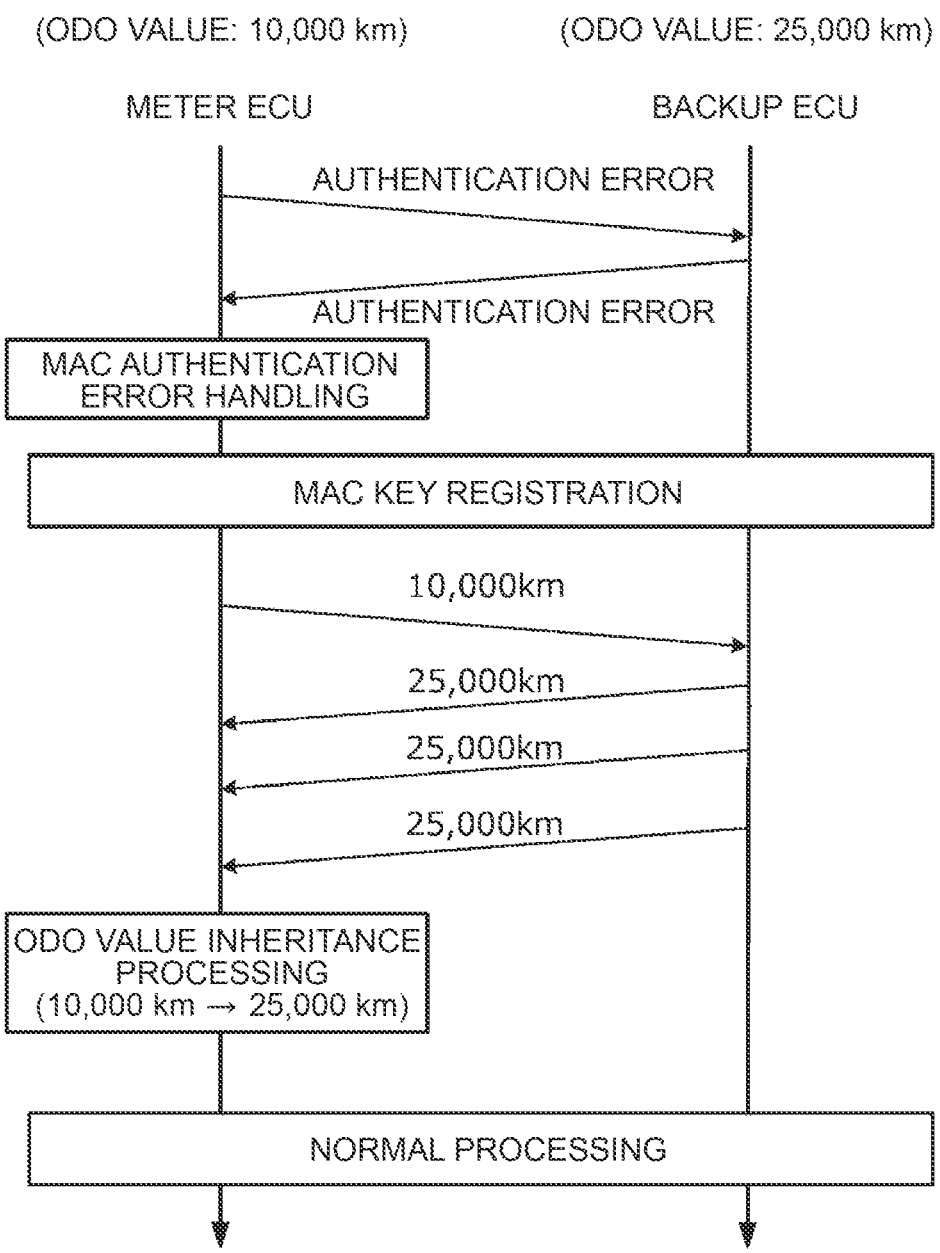
FIG. 4 is a sequence diagram schematically showing the inheritance process of FIG. 3.

FIG. 3 is a flowchart illustrating an example of a total mileage inheritance process by the vehicle control system of FIG. 1. Further, FIG. 4 is a sequence diagram schematically showing the inheritance process of FIG. 3. Hereinafter, the inheritance process of odd data in the vehicle control system 1 according to the present embodiment will be explained with reference mainly to FIGS. 3 and 4. In the sequence diagram shown in FIG. 4, in a state immediately after the meter ECU is replaced, the value of the total mileage held by the replaced meter ECU 10 at the time of replacement is 10,000 km, and the backup ECU 20 is A case where the value of the total traveling distance to be maintained is 25,000 km is exemplarily shown. In other words, the meter ECU 10 is the replaced total travel distance measurement unit 31N after replacement. In other words, the backup ECU 20 is a backup unit 32.

As shown in FIG. 3, the vehicle control system 1 according to the present embodiment first detects whether the authentication error flag 34 is on (step S2) when the ignition switch is turned on (step S1). If the authentication error flag 34 is on (Yes in step S2), it is determined that the odd data inheritance process may have been interrupted, and the process moves to step S5, which will be described later.

If it is determined that the authentication error flag 34 is off (No in step S2), then the vehicle control system 1 detects the presence or absence of a MAC authentication error (step S3). The presence or absence of a MAC authentication error is able to be confirmed by, for example, performing data communication between the meter ECU 10 forming the total travel distance measurement unit 31 and the backup ECU 20 forming the backup unit 32, as shown in FIG. 4. If the MAC authentication has been successfully performed (No in step S3), it is determined that the meter ECU 10 has not been replaced and there is no need to register a new MAC key. The process may then proceed to normal integration processing.

On the other hand, if the meter ECU 10 constituting the total travel distance measurement unit 31 is replaced due to a failure or the like, a MAC authentication error is detected in step S3 (Yes in step S3). When a MAC authentication error is detected, MAC authentication error processing is executed. Specifically, in order to ensure the completion of each subsequent step, the authentication error flag 34 is first turned on (step S4). Next, the vehicle control system 1 performs a new MAC key registration operation between the backup ECU 20 and the replaced meter ECU 10 (step S5). There is no particular limitation on the specific method of registering the MAC key. Note that when it is detected in step S2 that the authentication error flag 34 is in the on state and the process moves to step S4, registration of a new MAC key may have been completed. In that case, step S5 may be skipped.

When the registration of the above-mentioned new MAC key is completed, next, the vehicle control system 1 executes a process of inheriting the value of the total mileage to the replaced total travel distance measurement unit 31N by the total travel distance inheritance unit 33. do. Specifically, first, the value of the total mileage in the replaced total travel distance measurement unit 31N configured by the replaced meter ECU 10 and the value of the total mileage in the backup unit 32 constituted by the backup ECU 20. are compared (step S6). The comparison may be performed by transmitting and receiving odometer data held by each of the meter ECU 10 and the backup ECU 20. Note that the transmission and reception of the data may be performed multiple times, for example, about three times, in order to deal with transmission errors, data corruption, and the like.

Next, ODO value inheritance processing is performed based on the comparison result in step S6 (step S7). Specifically, as shown in FIG. 4, for example, the ODO value held by the replaced total travel distance measurement unit 31N was 10,000 km, while the ODO value held by the backup unit 32 was 25,000 km. If so, the ODO value held by the replaced total travel distance measurement unit 31N is updated from 10,000 km to 25,000 km. When the above-described ODO value inheritance process is completed, the authentication error flag 34 is finally turned off (step S8), and the process shifts to normal processing.

Although FIG. 4 shows an example in which the ODO value held by the replaced total travel distance measurement unit 31N is smaller than the ODO value held by the backup unit 32, the magnitude relationship between these two ODO values may be reversed. There may be cases. In such a case, as a result of the comparison in step S6, it is determined that the ODO value of the replaced total travel distance measurement unit 31N is larger, and in step S7, the ODO value of the replaced total travel distance measurement unit 31N is maintained as is.

Furthermore, in the vehicle control system 1 according to the embodiment described above, even when the backup ECU 20 constituting the backup unit 32 is replaced, a MAC authentication error is detected in the step S3 described above. In this case as well, by performing the above-mentioned steps S4 to S8, the ODO value held by the total travel distance measurement unit 31 is maintained as it is, and the process proceeds to normal processing, so the ODO value is not subtracted.

As explained above, according to the vehicle control system 1 according to the present embodiment, even if the meter ECU 10 is replaced, it is possible to suppress the value of the total mileage from being falsified. Specifically, it is possible to suppress the value of the total mileage from being subtracted. In addition, since the total mileage value can be updated only at the timing of MAC key registration, which is limited to once, it is possible to input the total mileage of the meter ECU after replacement and a simulated vehicle speed as in the past. There is no need to carry out work such as rolling it up. Therefore, it becomes possible to inherit the total distance traveled in a short time.

Furthermore, in the vehicle control system 1 according to the present embodiment, when the meter ECU 10 breaks down, for example, it is replaced with a meter ECU 10 that maintains a value of the total mileage larger than the value of the actual total mileage of the vehicle. Cases are also expected. However, even in such a case, in the vehicle control system 1 according to the present embodiment, the ODO value of the replaced total travel distance measurement unit 31N is (not the value of the actual total mileage of the vehicle) The ODO value held at the time of exchange is maintained. In the vehicle control system 1 according to the present embodiment, the function of suppressing falsification of the ODO value is strengthened by strictly suppressing subtraction of the ODO value as described above.

In the vehicle control system 1 described above, each component constituting the system is realized by the meter ECU 10 and the backup ECU 20 in the vehicle, but the present disclosure is not limited to such a structure. Not done. Specifically, the storage location for storing a copy of the odo data may be realized not in an in-vehicle facility such as the backup ECU 20, but in a facility outside the vehicle. Therefore, as an example of a vehicle control system 100 according to another embodiment, a vehicle control system 100 in which a copy of odd data is stored in a backup device outside the vehicle will be described below.

Figure 5:
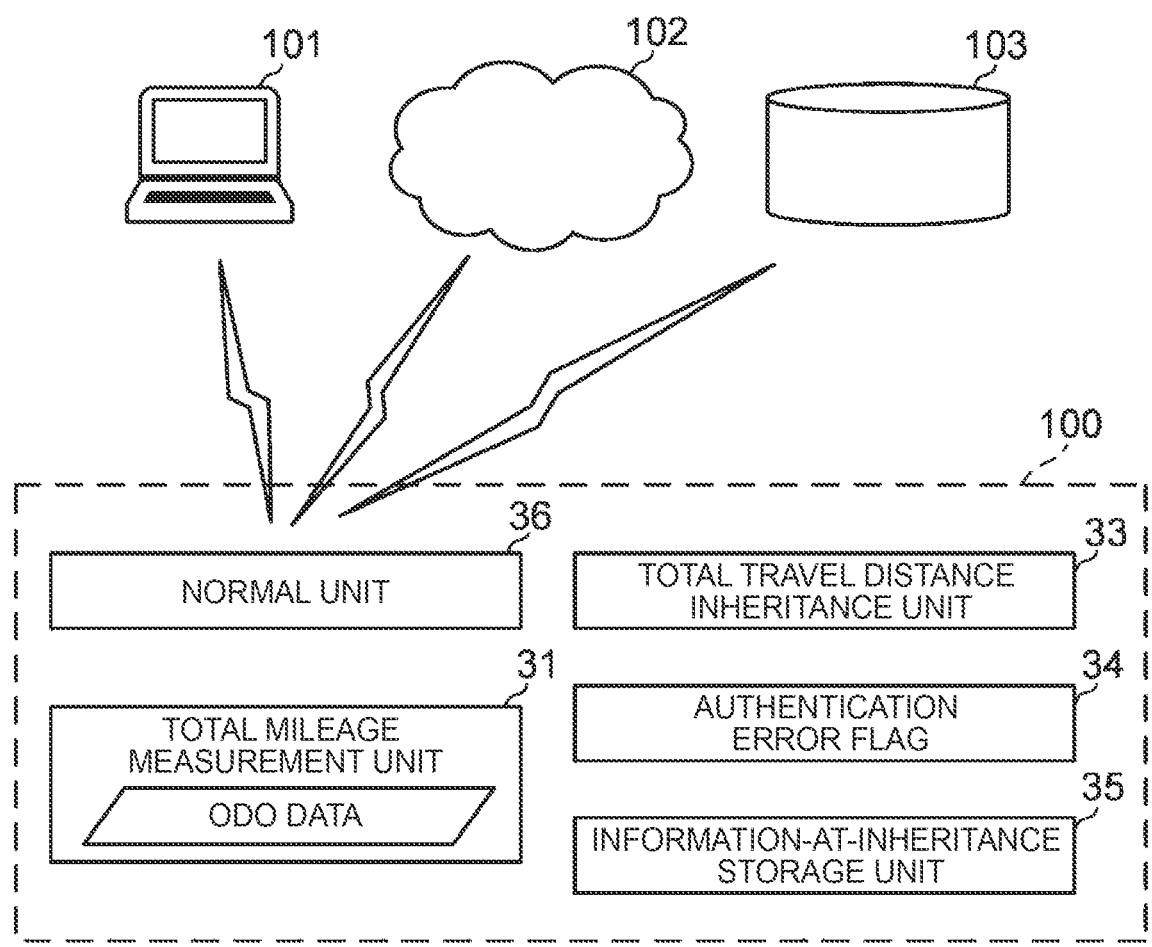
FIG. 5 is a functional block diagram showing an example of the software configuration of a vehicle control system according to another embodiment of the present disclosure.

FIG. 5 is a functional block diagram showing an example of the software configuration of a vehicle control system according to another embodiment of the present disclosure. As shown in FIG. 5, the vehicle control system 100 according to this embodiment includes the same components as the vehicle control system 1 described above, except that it includes a communication unit 36 instead of the backup unit 32. It may be included. Further, each configuration of the vehicle control system 100 according to the present embodiment can be realized by one or more ECUs, specifically, only the meter ECU 10 described above, or the meter ECU 10 and the backup ECU 20.

The communication unit 36 may be connectable to a network outside the vehicle through wired or wireless communication. The communication unit 36 is a backup device different from the backup ECU 20 described above, specifically, a maintenance PC 101 used for vehicle maintenance work, a cloud 102 whose part functions as a backup area, or an advanced driving system. It can be connected to at least one OTA (On The Air) server 103 for realizing an assistance system (Advanced Driver-Assistance Systems, ADAS). The maintenance PC 101, cloud 102, and OTA server 103 described above can realize the same functions as the backup unit 32 included in the backup ECU 20.

When a copy of the odd data is stored in a part of the maintenance PC 101, it is preferable that the maintenance PC 101 and the communication unit 36 are connected by wire, and the copy of the odd data is transmitted to the maintenance PC 101, for example. In addition, when a copy of the odo data is stored in a part of the cloud 102 or the OTA server 103, the latest odo data is transmitted from the communication unit 36 via wireless communication at any timing, for example, when the ignition switch is turned off. It is better to do this. No matter which component of the maintenance PC 101, the cloud 102, or the OTA server 103 is adopted, if these are referred to when executing the inheritance of the total mileage, the vehicle information according to the present embodiment described above can be used. Effects similar to those obtained by the vehicle control system 1 can be expected.

The present disclosure is not limited to the embodiments described above, and various modifications and changes can be made without departing from the spirit of the present disclosure. All of them are included in the technical idea of the present disclosure.

What is claimed is:

1. A vehicle control system comprising:
   a meter-side control device that is installed in a vehicle and comprises a total travel distance measurement unit configured to measure and store a total travel distance of the vehicle;
   a backup device comprising a backup unit, that is configured to acquire and store a copy of the total travel distance measured by the meter-side control device; and
   a total travel distance inheritance unit, wherein:
   in data communication between the meter-side control device and the backup device, an authentication signal using a common key is used; and
   when a new common key is registered between the meter-side control device and the backup device, the total travel distance inheritance unit specifies a larger value of a value of the total travel distance stored in the total travel distance measurement unit or a value of the copy of the total travel distance stored in the backup unit, to be the total travel distance of the total travel distance measurement unit.

2. The vehicle control system according to claim 1, wherein registration of the new common key is limited to one time.

3. The vehicle control system according to claim 1, further comprising an authentication error flag that is set to be ON when an authentication signal generated by the meter-side control device is detected not to be generated using a preset common key, and is set to be OFF when specifying the total travel distance by the total travel distance inheritance unit is executed, wherein the total travel distance inheritance unit specifies the total travel distance, when the authentication error flag is ON.

4. The vehicle control system according to claim 3, further comprising an information-at-inheritance storage unit that is configured to store at least one of a value of the authentication error flag when the total travel distance is specified by the total travel distance inheritance unit, the value of the total travel distance in the total travel distance measurement unit, the value of the copy of the total travel distance in the backup unit, and a time when the total travel distance is specified.

5. A vehicle control system comprising:
   a first meter-side control device that is installed in a vehicle and comprises a total travel distance measurement unit configured to measure and store a total travel distance of the vehicle;
   a backup device comprising a backup unit, that is configured to acquire and store a copy of the total travel distance measured by the first meter-side control device; and
   a total travel distance inheritance unit that is configured to transfer the total travel distance from the first meter-side control device to a second meter-side control device, wherein:
   in data communication between the first meter-side control device and the backup device, an authentication signal using a common key is used; and
   when a new common key is registered between the second meter-side control device and the backup device, the total travel distance inheritance unit specifies a larger value of a value of the total travel distance stored in the second meter-side control device or a value of the copy of the total travel distance stored in the backup unit and stores the specified value to the second meter-side control device as a total travel distance of the second meter-side control device.

6. The vehicle control system according to claim 5, wherein registration of the new common key is limited to one time.

7. The vehicle control system according to claim 5, further comprising an authentication error flag that is set to be ON when an authentication signal generated by the second meter-side control device is detected not to be generated using a preset common key, and is set to be OFF when specifying the total travel distance by the total travel distance inheritance unit is executed, wherein the total travel distance inheritance unit specifies the total travel distance, when the authentication error flag is ON.

8. The vehicle control system according to claim 7, further comprising an information-at-inheritance storage unit that is configured to store at least one of a value of the authentication error flag when the total travel distance is specified by the total travel distance inheritance unit, the value of the total travel distance stored in the total travel distance measurement unit, the value of the copy of the total travel distance in the backup unit, and a time when the total travel distance is specified.

9. A vehicle control system comprising:
   a meter-side control device that is installed in a vehicle and that is configured to measure and store a total travel distance of the vehicle; and
   a backup device that is configured to acquire and store a copy of the total travel distance measured by the meter-side control device, wherein:
   in data communication between the meter-side control device and the backup device, an authentication signal using a common key is used;
   when a new common key is registered between the meter-side control device and the backup device, a larger value of a value of the total travel distance stored in the meter-side control device and a value of the total travel distance stored in the backup device is taken as the total travel distance of the meter-side control device; and registration of the new common key is limited to one time.

10. The vehicle control system according to claim 9, further comprising:

in the meter-side control device, a total travel distance measurement unit that measures and stores the total travel distance;

in the backup device, a backup unit that stores the copy of the total travel distance; and a total travel distance inheritance unit that specifies, when the new common key is registered, a larger value of a value of the total travel distance in the total travel distance measurement unit and a value of the copy of the total travel distance in the backup unit, to be the total travel distance of the total travel distance measurement unit.

11. The vehicle control system according to claim 10, further comprising an authentication error flag that is set to be ON when an authentication signal generated by the meter-side control device is detected not to be generated using a preset common key, and is set to be OFF when specifying the total travel distance by the total travel distance inheritance unit is executed, wherein the total travel distance inheritance unit specifies the total travel distance, when the authentication error flag is ON.

12. The vehicle control system according to claim 11, further comprising an information-at-inheritance storage unit that is configured to store at least one of a value of the authentication error flag when the total travel distance is specified by the total travel distance inheritance unit, the value of the total travel distance stored in the total travel distance measurement unit, the value of the copy of the total travel distance stored in the backup unit, and a time when the total travel distance is specified.

\* \* \* \* \*